(12) United States Patent
Joyner et al.

(10) Patent No.: US 8,260,096 B2
(45) Date of Patent: Sep. 4, 2012

(54) PHOTONIC INTEGRATED CIRCUIT HAVING BENT ACTIVE COMPONENTS

(75) Inventors: Charles H. Joyner, Sunnyvale, CA (US); Peter W. Evans, Mountain House, CA (US); Scott Corzine, Sunnyvale, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 446 days.

(21) Appl. No.: 12/466,935

(22) Filed: May 15, 2009

(65) Prior Publication Data

US 2010/0290735 A1 Nov. 18, 2010

(51) Int. Cl.
*G02B 6/12* (2006.01)

(52) U.S. Cl. .......................................... 385/14

(58) Field of Classification Search .................. 385/14
See application file for complete search history.

(56) References Cited

U.S. PATENT DOCUMENTS

| | | | |
|---|---|---|---|
| 6,052,222 A * | 4/2000 | Kitamura | 359/344 |
| 2005/0100345 A1 * | 5/2005 | Welch et al. | 398/183 |
| 2006/0140228 A1 * | 6/2006 | McDonald et al. | 372/20 |
| 2006/0158230 A1 * | 7/2006 | Rahman | 327/89 |
| 2008/0267237 A1 * | 10/2008 | Hall et al. | 372/45.01 |

\* cited by examiner

*Primary Examiner* — Sung Pak
(74) *Attorney, Agent, or Firm* — David L. Soltz (57) ABSTRACT

Consistent with the present disclosure, the number of passive waveguides in a PIC are reduced by directly connecting active components to one another. Accordingly, optical signals propagating in the PIC may experience less loss, and, thus, improved performance may be achieved. In addition, active components may be bent or curved in order to obtain a more compact layout with greater device density. Reduced manufacturing costs can therefore be realized.

17 Claims, 8 Drawing Sheets

PHOTONIC INTEGRATED CIRCUIT HAVING BENT ACTIVE COMPONENTS

BACKGROUND

Wavelength division multiplexed (WDM) optical communication systems are known in which multiple optical signals, each having a different wavelength, are combined onto a single optical fiber. Such systems typically include a laser associated with each wavelength, a modulator configured to modulate the output of the laser, and an optical combiner to combine each of the modulated outputs.

Conventional WDM systems have been constructed from discrete components. For example, the lasers, modulators and combiners have been packaged separately and provided on a printed circuit board. More recently, however, many WDM components have been integrated onto a single chip, also referred to as a photonic integrated circuit (PIC).

Typically, the PIC includes active components that generate, amplify, and/or attenuate light, such as lasers, modulators, amplifiers, and variable optical attenuators (VOAs). Such active components often pass light from one to another over passive waveguides. The passive waveguides, however, introduce optical loss and occupy space on the PIC. As a result, the number of active components that can be integrated on the PIC, as well as overall device density, is limited.

PICs are typically manufactured by processing a semiconductor wafer, which is then diced or cleaved into individual die. By increasing device density, more die, and thus, more PICs may be obtained from a given wafer, resulting in reduced manufacturing costs. Accordingly, there is need for PICs having improved performance and lower fabrication costs.

SUMMARY OF THE INVENTION

Consistent with an aspect of the present disclosure, a photonic integrated circuit is provided that includes a semiconductor substrate and a plurality of lasers provided on the substrate. Each of the plurality of lasers provides a corresponding one of a plurality of optical signals, and each of the plurality of optical signals has a corresponding one of a plurality of wavelengths. A plurality of active devices are also provided on the substrate. Each of the plurality of active devices transmits at least a portion of a corresponding one of the plurality of optical signals to thereby supply a corresponding one of a plurality of optical outputs. In addition, each of the plurality of active devices is configured to pass a corresponding one of a plurality of electrical currents, such that an intensity or phase of each of the plurality of optical outputs is based, at least in part, on a respective one of the plurality of electrical currents. One of the plurality of active devices includes a bent portion, such that one of the plurality of optical signals propagates in a first direction upon entering the one of the plurality of active devices and propagates in a second direction, different than the first direction, upon exiting the one of the plurality of active devices. An optical combiner is also provided on the substrate. The optical combiner has a plurality of optical input ports, each of which receiving a corresponding one of the plurality of optical outputs. The optical combiner supplies a wavelength division multiplexed signal including the plurality of optical outputs.

Consistent with an additional aspect of the present disclosure, a photonic integrated circuit is provided that includes a semiconductor substrate, and a laser, provided on the substrate, that outputs an optical signal. The photonic integrated circuit also includes an active device provided on the substrate. The active device transmits at least a portion of the optical signal to thereby supply an optical output. In addition, the active device is configured to pass an electrical current, such that an intensity or phase of the optical output is based, at least in part, on the electrical current. Further, the active device includes a bent portion, such that the optical signal propagates in a first direction upon entering the active device and propagates in a second direction, different than the first direction, upon exiting the active device. An optical combiner is also provided on the substrate. The optical combiner has an input port and an output port, such that the input port receives the optical output and supplies the optical output through the output port.

It is to be understood that both the foregoing general description and the following detailed description are exemplary and explanatory only and are not restrictive of the invention, as claimed.

The accompanying drawings, which are incorporated in and constitute a part of this specification, embodiments of the disclosure and together with the description, serve to explain the aspects of the invention.

DESCRIPTION OF THE EMBODIMENTS

Consistent with the present disclosure, the number of passive waveguides in a PIC are reduced by directly connecting active components to one another. Accordingly, optical signals propagating in the PIC may experience less loss, and, thus, improved performance may be achieved. In addition, active components may be bent or curved in order to obtain a more compact layout with greater device density. Reduced manufacturing costs can therefore be realized.

Reference will now be made in detail to the present exemplary embodiments, which are illustrated in the accompanying drawings. Wherever possible, the same reference numbers will be used throughout the drawings to refer to the same or like parts.

Figure 1:
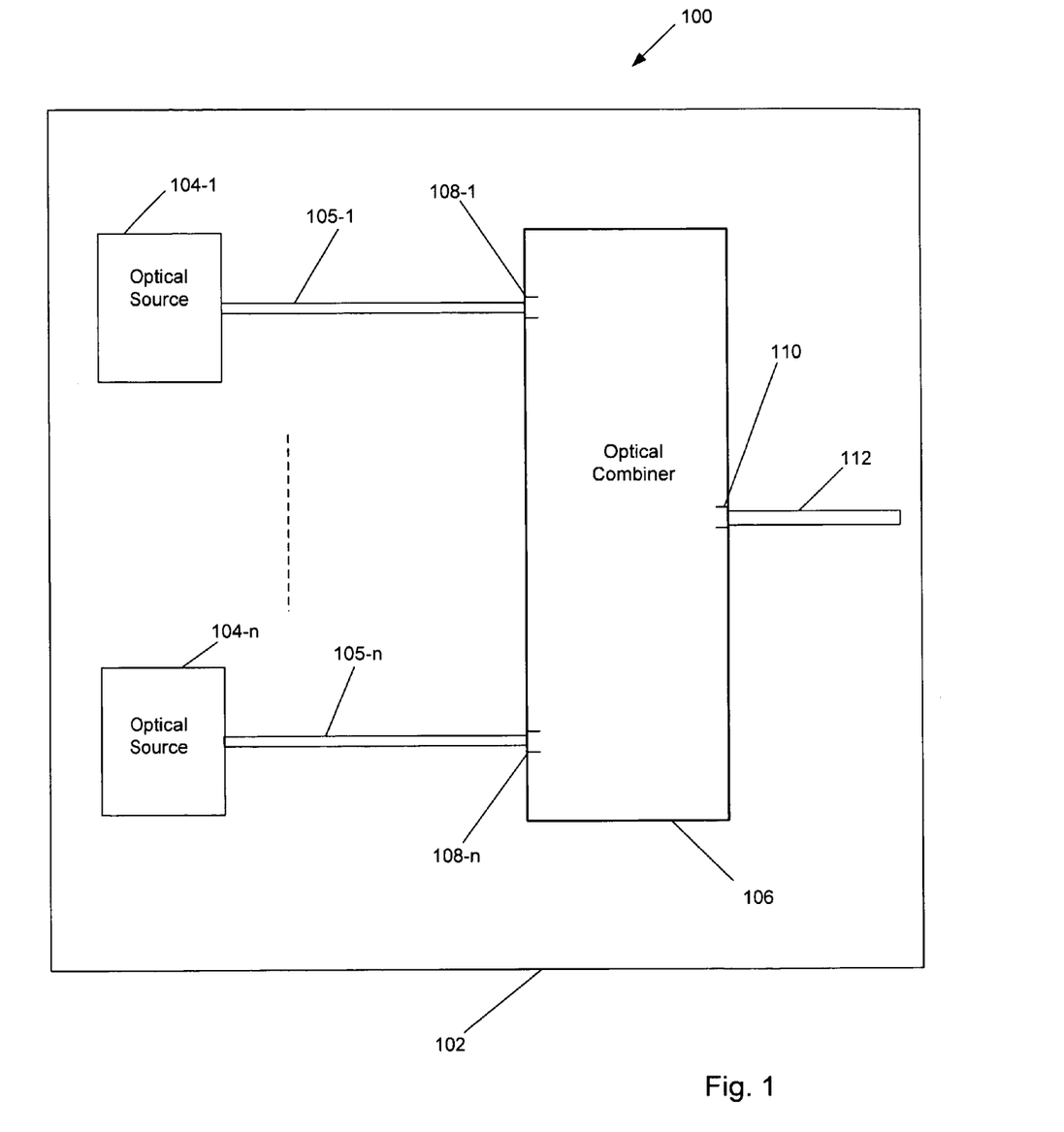
FIG. 1 is a block diagram of a photonic integrated circuit consistent with the present disclosure.

FIG. 1 shows a photonic integrated circuit (PIC) 100 that includes a plurality of laser sources 104-1 to 104-n provided on substrate 102. Each optical source 104-1 to 104-n generates a corresponding one of a plurality of optical signals, and each of the plurality of optical signals has a corresponding one of a plurality of wavelengths. Each of the optical signals propagates in a corresponding one of a plurality of waveguides or optical paths 105-1 to 105-n to optical multiplexer or combiner 106. Optical combiner 110 has a plurality of input ports 108-1 to 108-*n*, which receive a corresponding one of the optical signals. Each of input ports 108-1 to 108-*n* may include a waveguide, for example, or may constitute part of a corresponding one of waveguides 105-1 to 105-*n*. Optical combiner 106 combines the optical signals into a wavelength division multiplexed (WDM) signal, which is supplied through output port 110. Waveguide 112 may be coupled or otherwise connected to output port 110 to feed the WDM signal to a fiber (not shown) that carries the WDM signal to downstream networking elements. Port 110 may include a portion of waveguide 112. Optical combiner 110 may include an arrayed waveguide grating (AWG), as described, for example, in U.S. Pat. No. 7,162,113, the entire contents of which are incorporated herein by reference.

Figure 2A:
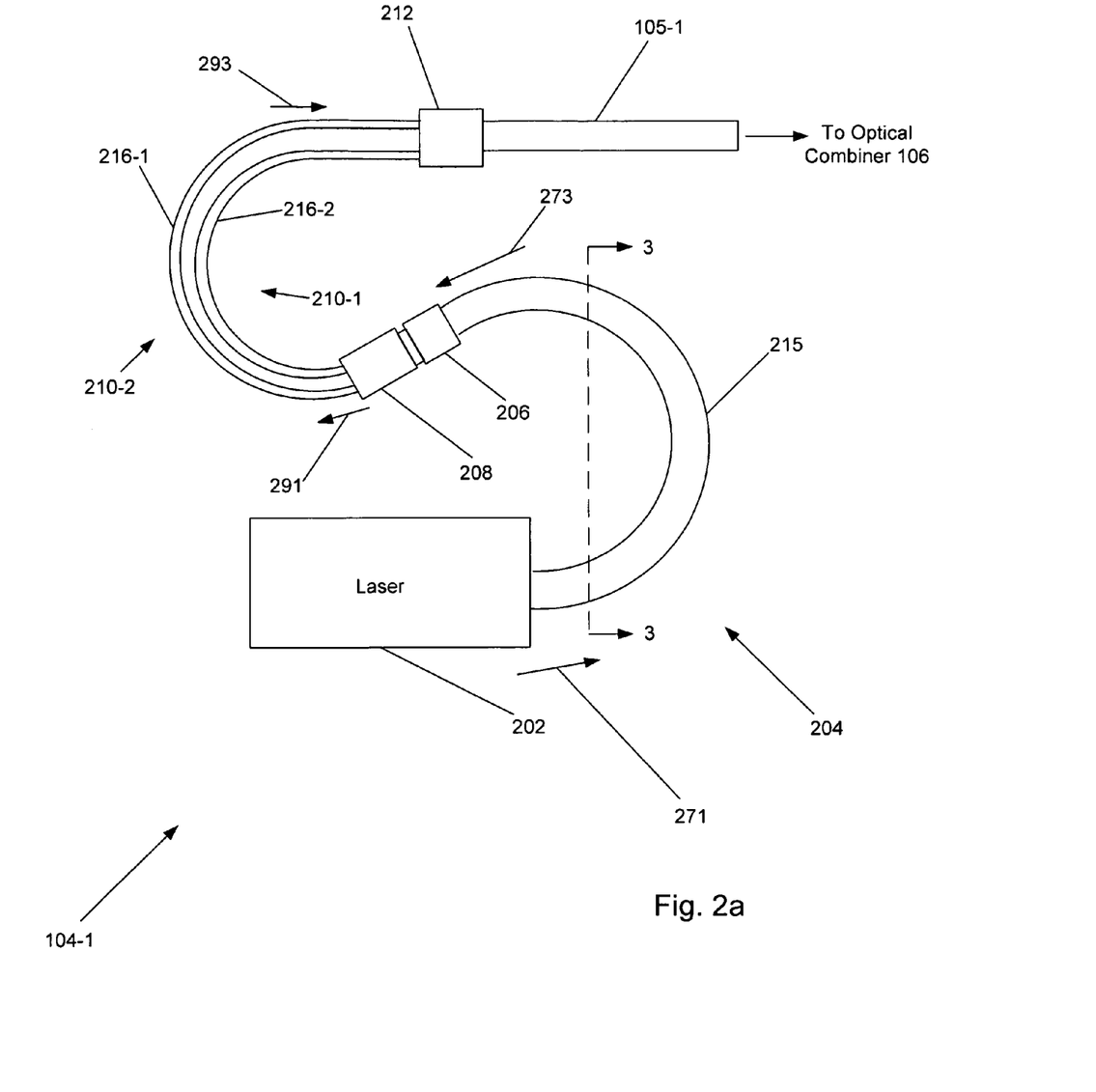
FIG. 2a is a plan view of an optical source consistent with the present disclosure.

FIG. 2a is a plan view of optical source 104-1 consistent with an aspect of the present disclosure. It is understood that remaining optical sources 104-2 to 104-*n* have the same or similar structure. Optical source 104-1 includes a laser 202, which, may be a semiconductor laser, such as a distributed feedback (DFB) laser. An active device, such as a phase modulator 204 may be directly connected to laser 202 to modulate a phase of light output from laser 202. Phase modulator 204, in turn, may feed phase modulated light to a variable optical attenuator (VOA) 206, for example, in order to adjust or attenuate the power level or intensity of the phase modulated light.

VOA 206 supplies power adjusted light to a first multimode interference (MMI) coupler that may serve as a power splitter to supply power split portions of the light to branches 210-1 and 210-2. Each of branches 210-1 and 210-2 may constitute an additional phase modulator to modulate the light in accordance with data to be transmitted to a downstream node (not shown). Branches 210-1 and 210-2 are coupled to a second MMI coupler that combines the light carried in both branches. The combined light is then supplied to a waveguide 105-1, which, as noted above, directs the light to optical combiner 110.

As further shown in FIG. 2a, phase modulator 204 and branches 210-1 and 210-2 are examples of active devices including bent portions 215, 216-1 and 216-2, respectively. The bent portions are configured such that light enters each of these devices in a first direction (see arrows 271 and 291) and exits each device in a second direction (see arrows 273 and 293) different than the first direction. The bent portions may be formed through wet or dry etching. In addition, the bent portions may increase device density, thereby reducing manufacturing costs, as noted above. Moreover, since phase modulator 204 is directly connected to laser 202 and VOA 206, relatively lossy passive waveguides can be omitted, such that performance can be improved. Passive waveguides may also be omitted between the end portions of branches 210-1, 210-2 and MMI couplers 208 and 206 to obtain further reductions in optical loss.

As used herein, "active devices' are those that pass an electrical current, while, in passive devices, no or substantially little electrical current passes therethrough. Further, a phase, intensity, or power of an optical signal transmitted or pass through the active device is based, at least in part, on the such current.

Figure 2B:
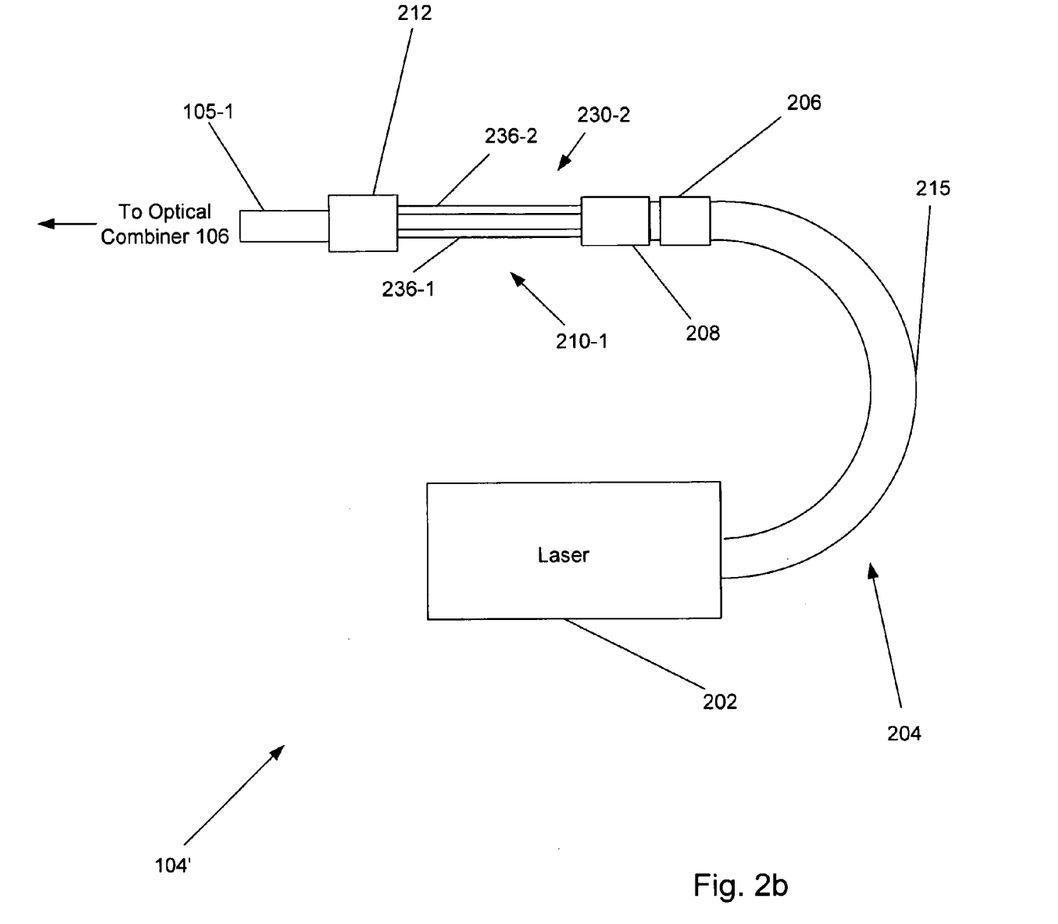
FIG. 2b is a plan view of another example of an optical source consistent with an additional aspect of the present disclosure.

FIG. 2b illustrates an alternative optical source 104' in which branches 210-1 and 210-2 include straight portions 236-1 and 236-2, respectively, instead of bent portions 216-1 and 216-2 discussed above. Otherwise, optical source 104' has the same or similar construction as optical source 104-1.

Figure 3:
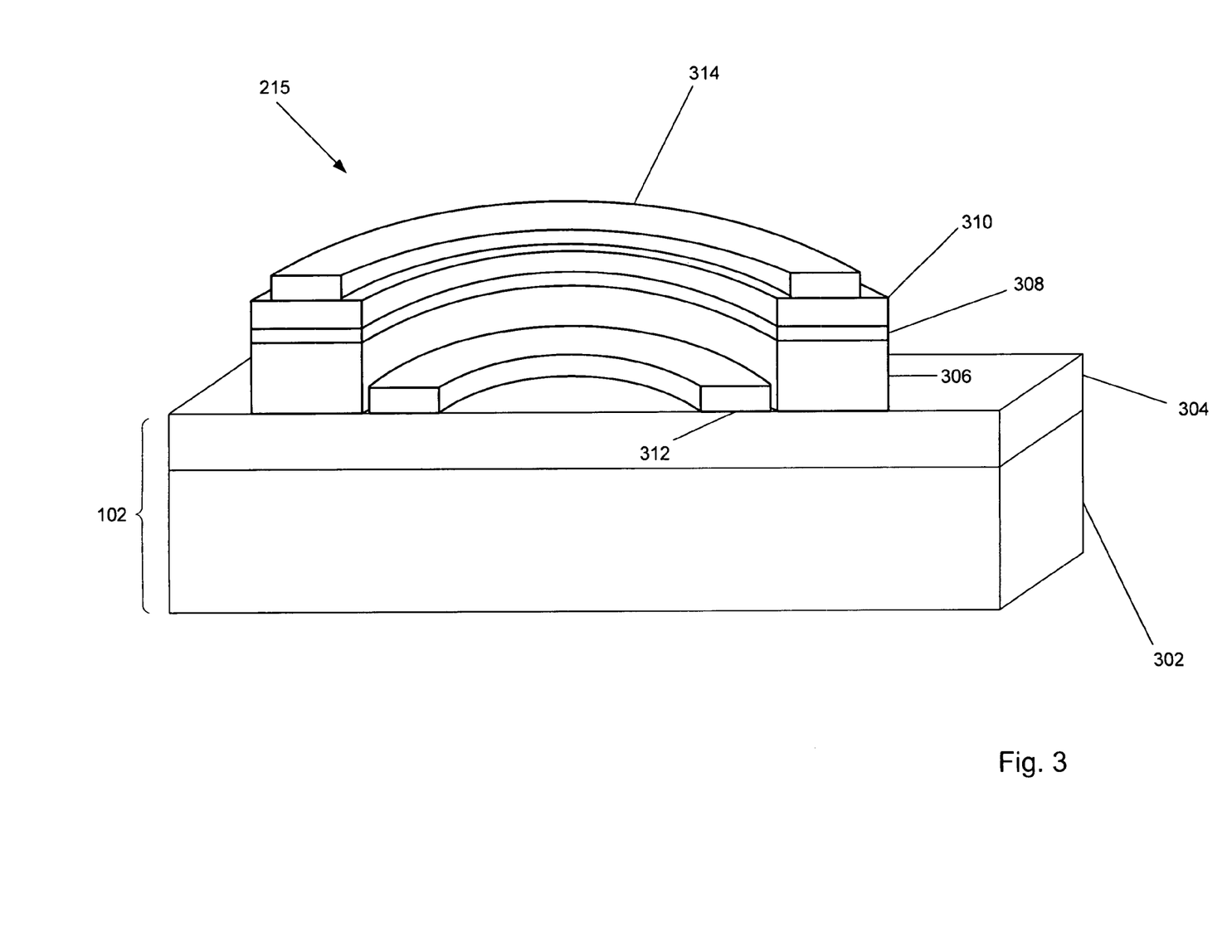
FIG. 3 is a perspective cross-sectional view of a portion of the optical source shown in FIG. 2.

FIG. 3 shows a perspective cross-sectional view of bent portion 215 taken along line 3 shown in FIG. 2 and also illustrates features of phase modulator 204 in greater detail.

Phase modulator 204 may include semiconductor layers 306, 308, and 310. Semiconductor layer 308 may be an intrinsic semiconductor layer, which is sandwiched between n-type semiconductor layer 306 and p-type semiconductor layer 310. N-type layer 306 may be provided on a more heavily doped (n+) epitaxial layer 304, which has been deposited on substrate 302 (collectively layer 304 and substrate 302 may constitute "substrate" 102 described above in connection with FIG. 1). A first electrode 312 may also be provided on epitaxial layer 304 and a second electrode 315 may be provided on p-type semiconductor layer 310. In a known manner, current may flow from electrode 312 and be passed through layers 304, 306, 308, and 310 to electrode 314, and based, at least in part, on such current the phase of light transmitted through phase modulator 204 may be modulated. In addition, these active devices may also pass a current, such that the power or intensity of light transmitted through these devices is based, at least in part, on such current.

Figure 4:
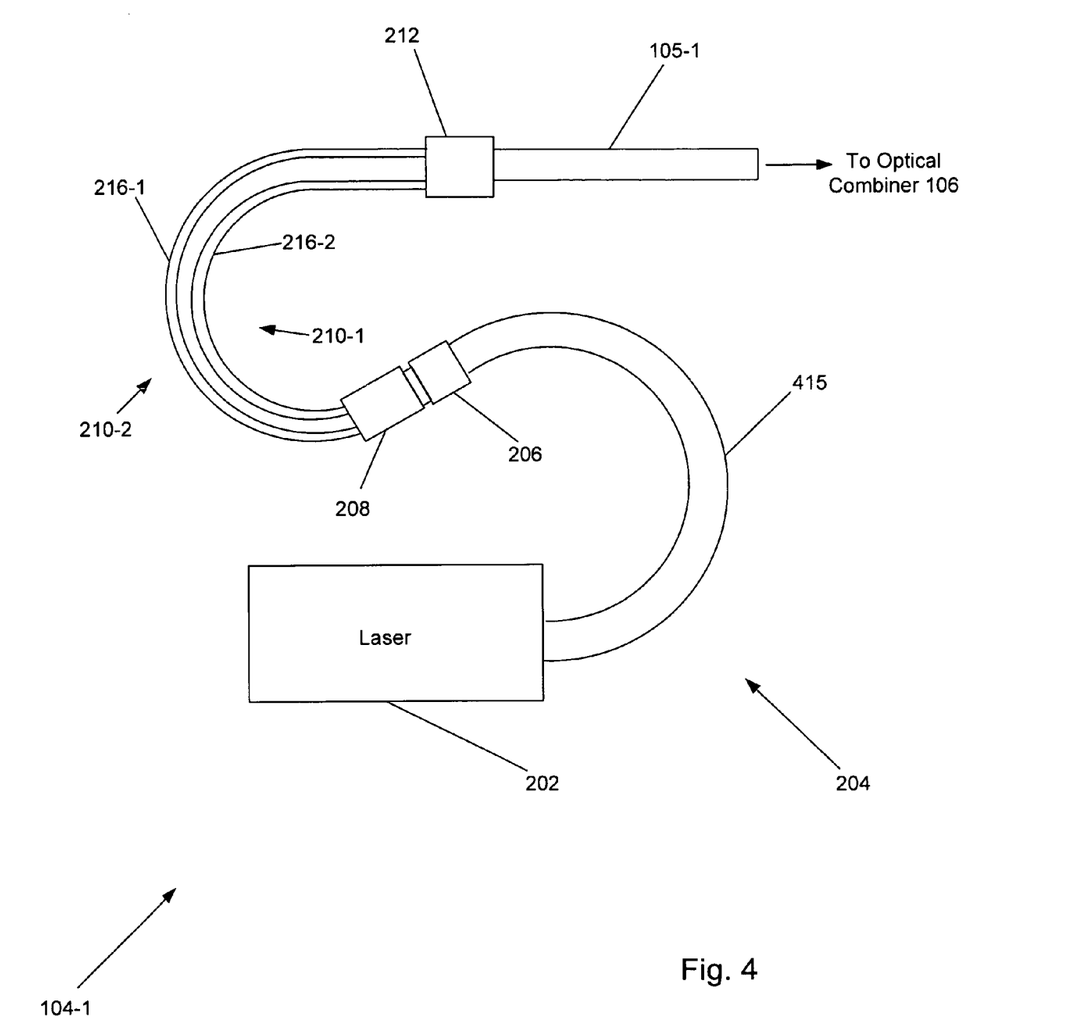
FIG. 4 is a plan view of an optical source consistent with an additional aspect of the present disclosure.
Figure 5:
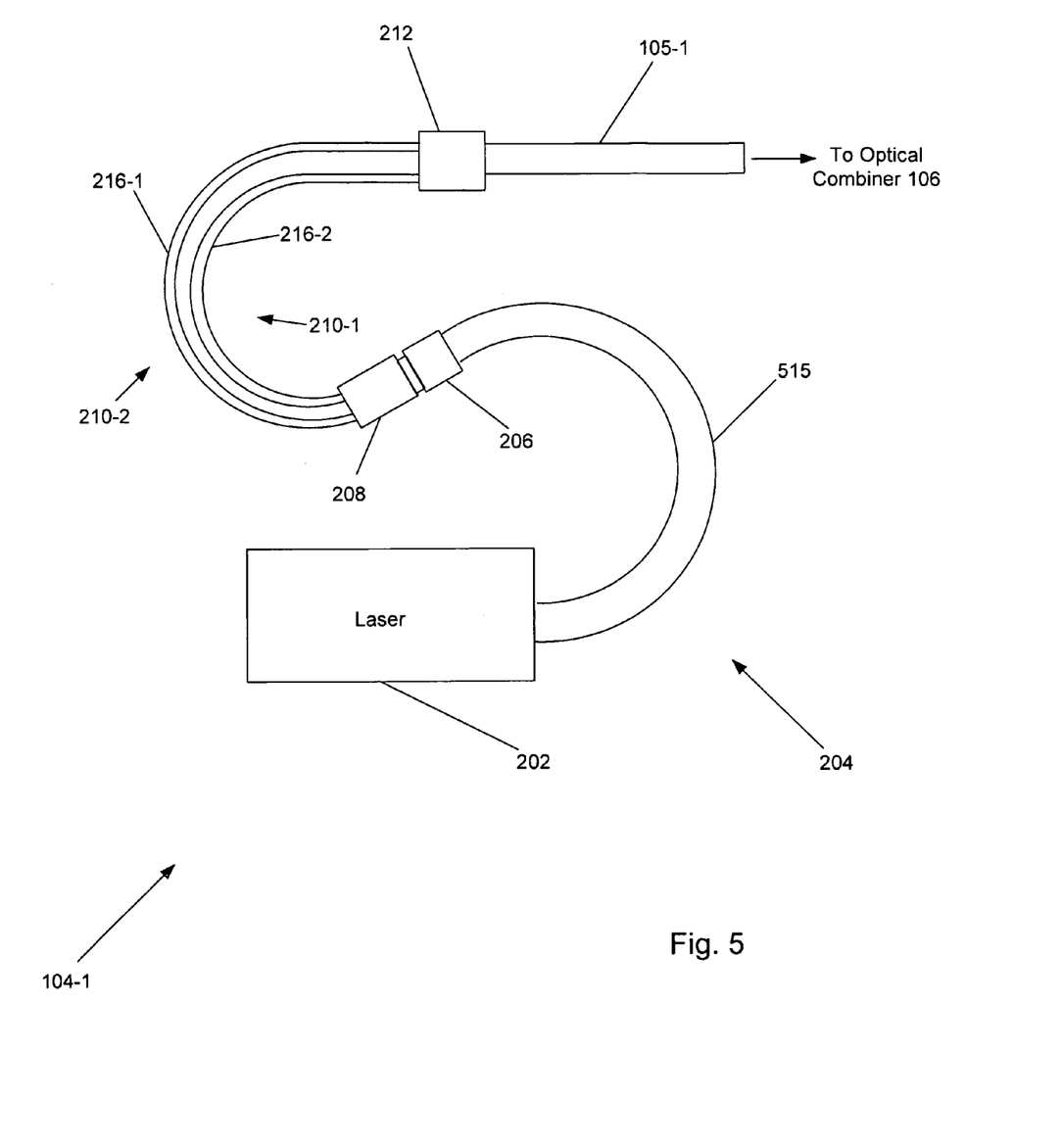
FIG. 5 is a plan view of an optical source consistent with a further aspect of the present disclosure.

Other embodiments of the invention will be apparent to those skilled in the art from consideration of the specification and practice of the invention disclosed herein. For example, bent active devices other than the phase modulator described above may also be incorporated onto PIC 100. FIGS. 4 and 5 show alternative optical sources including other exemplary active devices. In FIG. 4, such exemplary active devices include semiconductor optical amplifiers (SOAs), e.g., SOA 415 coupled to laser 202, and, in FIG. 5, such devices include electro-absorption modulators (EAMs), e.g., EAM 515 coupled to laser 202. In these examples, as in the examples discussed above in connection with FIGS. 1-3, the active devices may be bent to increase device density.

Figure 6:
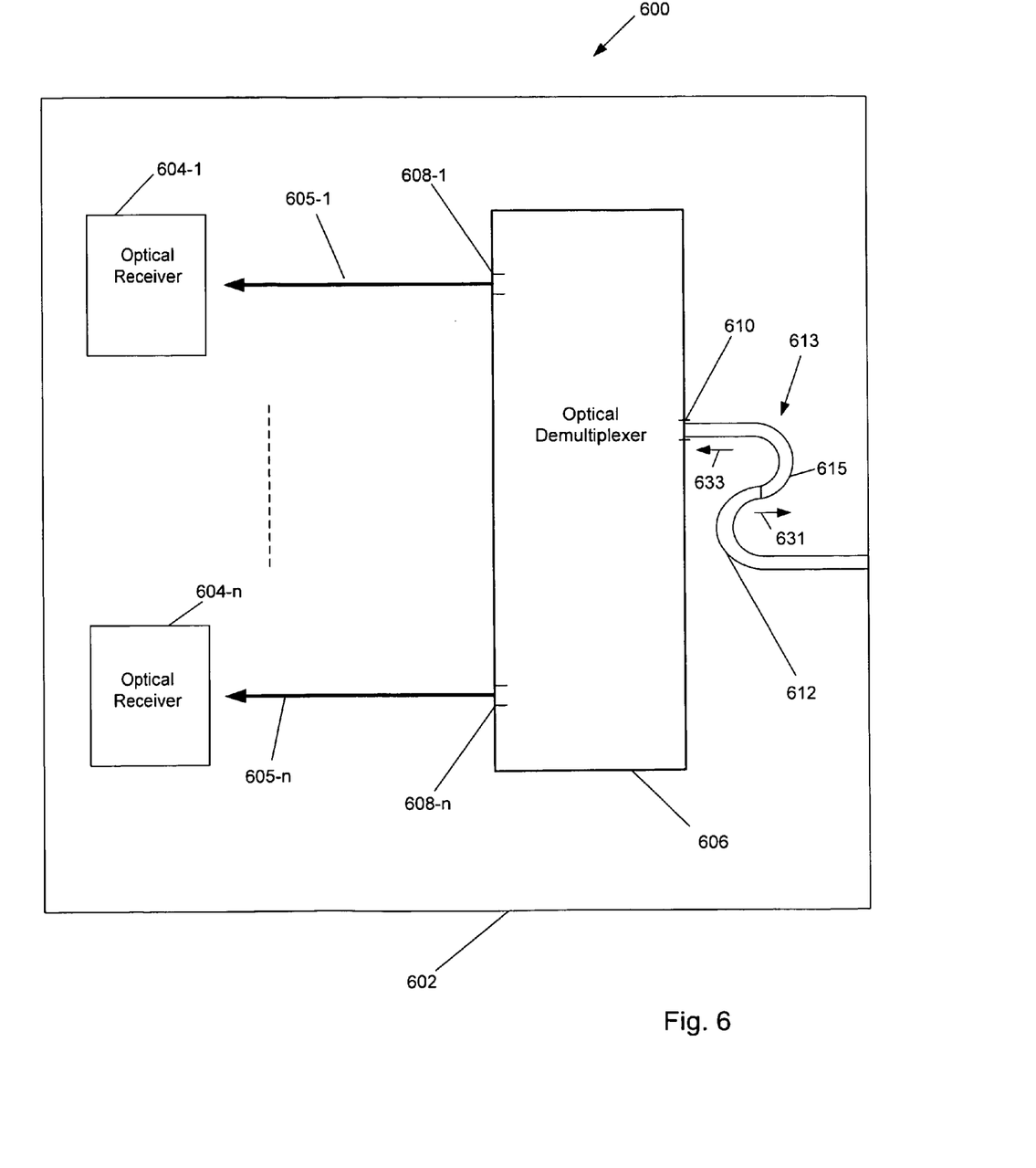
FIG. 6 illustrates an example of a photonic integrated circuit consistent with an additional aspect of the present disclosure.

FIG. 6 illustrates a PIC 600 consistent with an additional aspect of the present disclosure. PIC 600 may be provided downstream from PIC 100 shown in FIG. 1 in order to receive the optical signals launched by PIC 100. PIC 600 may include a waveguide 612 that receives the optical signals and directs the optical signals to an active device, such as a semiconductor optical amplifier (SOA) 613. SOA 613 may have a structure similar to that shown in FIG. 3, including electrodes that supply a current through the device. In response to or based on such current, SOA 613 amplifies the optical signals in a known manner to thereby increase the intensity of at least one of the optical signals. As a result, loss encountered by the optical signals prior to reaching PIC 600 may be offset by the gain or amplification provided by SOA 613. Alternatively, SOA 613 may pre-amplify the optical signals prior to being input to optical demultiplexer 606 in order to offset losses introduced by demultipelxer 606.

As further shown in FIG. 6, SOA 613 has a bent portion 615, such that the optical signals enter SOA 613 in first direction (see arrow 631) and exit in a second direction (see arrow 633) that is different than the first direction. Upon exiting SOA 613, the optical signals may next be supplied to optical demultiplexer 606 via an input 610. Optical demultiplexer 606 may also include an arrayed waveguide grating (AWG), to thereby separate and supply each of the plurality of optical signals at a corresponding one of outputs 608-1 to 608-*n*. Other known optical demultiplexers may also be employed, such as interleavers, and optical filters. The demultiplexed optical signals (represented by arrows 605-1 to 605-*n* in FIG. 6 are supplied to a corresponding one of optical receiver circuits 604-1 to 604-*n*, which convert the optical signals into corresponding electrical signals, as discussed in greater detail below with reference to FIG. 7.

Figure 7:
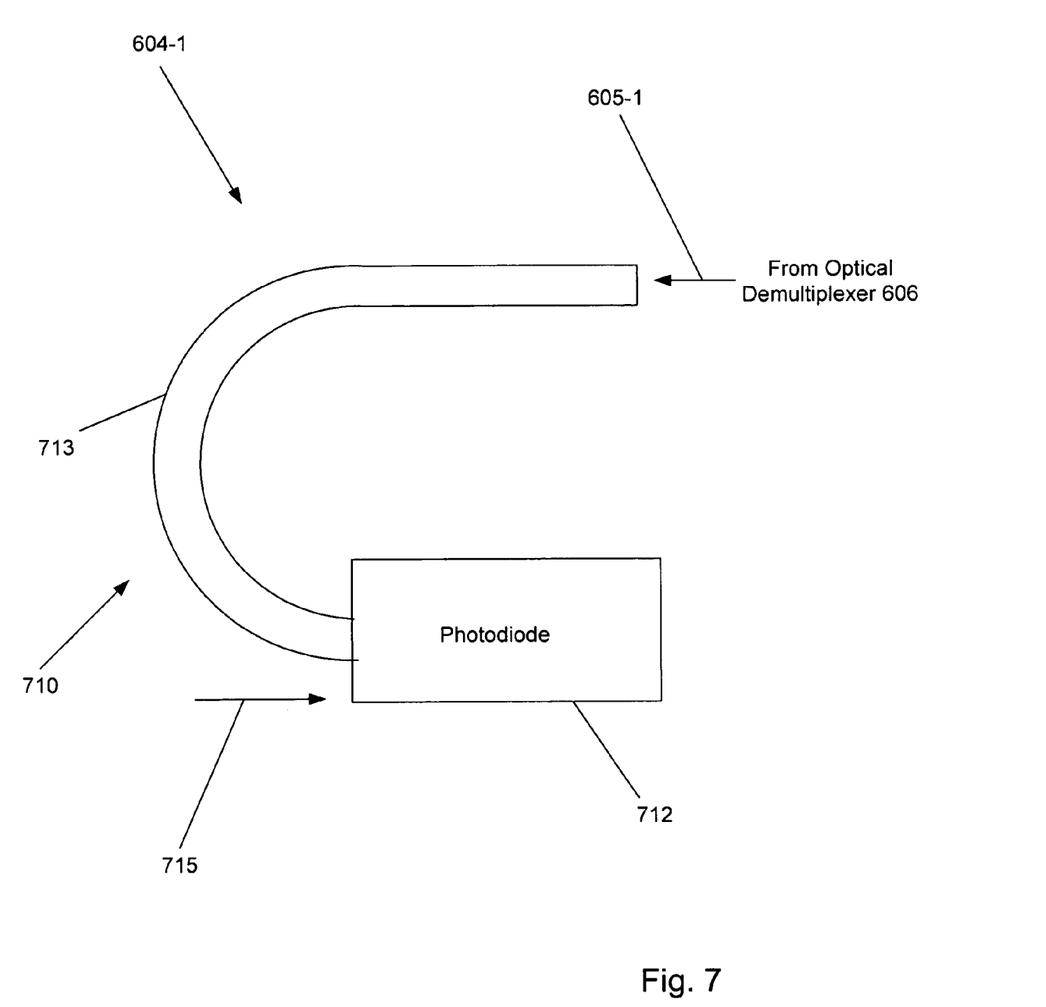
FIG. 7 illustrates a plan view of an optical receiver consistent with a further aspect of the present disclosure.

FIG. 7 illustrates optical receiver circuit 604-1 in greater detail. It is understood that remaining optical receiver circuits 604-2 to 604-*n* have the same or similar structure as optical receiver 604-1. Optical receiver 604-1 receives optical signal 605-1 from output 608-1 of optical demultiplexer 606. Optical signal 605-1 is supplied to a variable optical attenuator 710 (VOA) which, in turn, feeds the optical signal to a photodiode 712. VOA 710 may also include electrodes, similar to those shown in FIG. 3 to pass a current therethrough. Based on such current, VOA 710 attenuates optical signal 605-1, preferably by a desired amount to be within the dynamic range of photodiode 712 (i.e., the range of optical signal power levels that can be adequately sensed by photodiode 712).

VOA 710 includes a bent portion 713, such that, when entering VOA 710, optical signal 605-1 propagates in a first direction (as indicated by the arrow associated with optical signal 605-1), and, upon exiting VOA 710, optical signal 605-1 propagates in a second direction, as indicated by arrow 715. By providing SOA 613 and VOA 710 with bent portions 615 and 713, respectively, PIC 600 can be realized with a more compact geometry.

It is further noted that the conductivity types noted above are exemplary only, and may be interchanged. It is intended that the specification and examples be considered as exemplary only, with a true scope and spirit of the invention being indicated by the following claims.

What is claimed is:

1. A photonic integrated circuit, comprising:
    a semiconductor substrate;
    a plurality of lasers provided on the semiconductor substrate, each of the plurality of lasers providing a corresponding one of a plurality of optical signals, each of the plurality of optical signals having a corresponding one of a plurality of wavelengths;
    a plurality of active devices provided on the semiconductor substrate, each of the plurality of active devices transmitting at least a portion of a corresponding one of the plurality of optical signals to thereby supply a corresponding one of a plurality of optical outputs, each of the plurality of active devices being configured to pass a corresponding one of a plurality of electrical currents, such that an intensity of each of the plurality of optical outputs is based, at least in part, on a respective one of the plurality of electrical currents, one of the plurality of active devices including a bent portion, such that one of the plurality of optical signals propagates in a first direction upon entering said one of the plurality of active devices and propagates in a second direction upon exiting said one of the plurality of active devices, the first direction being different than the second direction, said one of the plurality of active devices being selected from a group consisting of a phase modulator and a variable optical attenuator (VOA); and
    an optical combiner provided on the semiconductor substrate, the optical combiner having a plurality of optical input ports, each of which receiving a corresponding one of the plurality of optical outputs, the optical combiner supplying a wavelength division multiplexed signal including the plurality of optical outputs.

2. A photonic integrated circuit in accordance with claim 1, wherein each of the plurality of active devices includes first, second and third semiconductor layers, the first semiconductor layer having an n-conductivity type, the second semiconductor layer being intrinsic, and the third semiconductor layer having a p-conductivity type, the second semiconductor layer being provided between the first and third semiconductor layers.

3. A photonic integrated circuit in accordance with claim 1, wherein each of the plurality of active devices contacts a corresponding one of the plurality of lasers.

4. A photonic integrated circuit in accordance with claim 1, wherein the bent portion has an arcuate shape.

5. A photonic integrated circuit in accordance with claim 1, wherein the optical combiner includes an arrayed waveguide grating (AWG).

6. A photonic integrated circuit in accordance with claim 1, wherein the plurality of active devices is a first plurality of active devices and the bent portion is a first bent portion, the photonic integrated circuit further including a second plurality of active devices, each of the second plurality of active devices being coupled to a corresponding one of the first plurality of active devices and a corresponding one of the plurality of inputs of the optical combiner, each of the second plurality of active devices including a second bent portion.

7. A photonic integrated circuit in accordance with claim 1, wherein each of the second plurality of active devices constitutes at least a portion of an arm of a Mach-Zehnder interferometer.

8. A photonic integrated circuit in accordance with claim 6, further including a plurality of first multi-mode interference (MMI) couplers and a plurality of second MMI couplers, each of the second plurality of active devices being coupled between a corresponding one of the plurality of first MMI couplers and a corresponding one of the plurality of second MMI couplers, each of the second MMI couplers being coupled to a corresponding one of the plurality of inputs of the optical combiner.

9. A photonic integrated circuit, comprising:
    a semiconductor substrate;
    a laser provided on the substrate, the laser providing an optical;
    an active device provided on the substrate, the active device transmitting at least a portion of the optical signal to thereby supply an optical output, the active device being configured to pass an electrical current, such that an intensity the optical output is based, at least in part, on the electrical current, the active device including a bent portion, such that the optical signal propagates in a first direction upon entering the active device and propagates in a second direction upon exiting the active device, the first direction being different than the second direction, the active device being selected from a group consisting of a phase modulator and a variable optical attenuator (VOA); and
    an optical combiner provided on the substrate, the optical combiner having an input port and an output port, the input port receives the optical output and supplies the optical output through the output port.

10. A photonic integrated circuit in accordance with claim 9, wherein the active device includes first, second and third semiconductor layers, the first semiconductor layer having an n-conductivity type, the second semiconductor layer being intrinsic, and the third semiconductor layer having a p-conductivity type, the second semiconductor layer being provided between the first and third semiconductor layers.

11. A photonic integrated circuit in accordance with claim 9, wherein the active device contacts the laser.

12. A photonic integrated circuit in accordance with claim 9, wherein the bent portion has an arcuate shape.

13. A photonic integrated circuit in accordance with claim 9, wherein the optical combiner includes an arrayed waveguide grating (AWG).

14. A photonic integrated circuit in accordance with claim 9, wherein the active device is a first active device and the bent portion is a first bent portion, the photonic integrated circuit further including a second active device, the second active device being coupled to the first active device and the input port of the optical combiner and including a second bent portion.

15. A photonic integrated circuit in accordance with claim 9, wherein the second active device constitutes at least a portion of an arm of a Mach-Zehnder interferometer.

16. A photonic integrated circuit in accordance with claim 14, further including a first multi-mode interference (MMI) coupler and a second MMI coupler, the second active device being coupled between the first MMI coupler and the second MMI coupler, the second MMI coupler being coupled to the input of the optical combiner.

17. A photonic integrated circuit, comprising:

a semiconductor substrate;

an optical demultiplexer provided on the substrate, the optical demultiplexer having an input that receives a plurality of optical signals, each of which having a corresponding one of a plurality of wavelengths, the optical demultiplexer also has a plurality of outputs, each of which supplying a corresponding one of the plurality of optical signals; and an active device provided on the substrate, the active device being configured to receive one of the plurality of optical signals supplied from a corresponding one of the plurality of outputs of the optical demultiplexer, the active device is configured to pass an electrical current, such that an intensity associated with said one of the plurality of optical signals is based, at least in part, on the electrical current, the active device being a variable optical attenuator (VOA); and a photodiode, the active device supplying said one of the plurality of optical signals to the photodiode, wherein the active device includes a bent portion, such that said one of the plurality of optical signals propagates in a first direction upon entering the active device and propagates in a second direction upon exiting the active device, the first direction being different than the second direction.

* * * * *